(12) United States Patent
Feng

(10) Patent No.: US 9,634,592 B2
(45) Date of Patent: Apr. 25, 2017

(54) METHOD OF ESTIMATING ROTATIONAL POSITION OF MOTOR, AND CONTROL APPARATUS OF MOTOR

(71) Applicants: Nidec Singapore PTE., Ltd., Singapore (SG); Nidec Corporation, Kyoto (JP)

(72) Inventor: Ju Feng, Singapore (SG)

(73) Assignees: NIDEC SINGAPORE PTE., LTD., Singapore (SG); NIDEC CORPORATION, Kyoto (JP)

( * ) Notice: Subject to any disclaimer, the term of this patent is extended or adjusted under 35 U.S.C. 154(b) by 0 days.

(21) Appl. No.: 15/015,665

(22) Filed: Feb. 4, 2016

(65) Prior Publication Data

US 2016/0301338 A1 Oct. 13, 2016

(30) Foreign Application Priority Data

Apr. 10, 2015 (JP) ................................. 2015-081010

(51) Int. Cl.
*H02P 1/04* (2006.01)
*H02P 6/18* (2016.01)

(52) U.S. Cl.
CPC .................... *H02P 6/183* (2013.01)

(58) Field of Classification Search
CPC ........................................ H02P 6/183
USPC .................................... 318/400.33
See application file for complete search history.

(56) References Cited

U.S. PATENT DOCUMENTS

| | | | |
|---|---|---|---|
| 5,650,708 A | * | 7/1997 | Sawada ............... B60L 11/1803 318/801 |
| 7,157,876 B2 | | 1/2007 | Ide et al. |
| 7,190,130 B2 | | 3/2007 | Wogari et al. |
| 8,120,296 B2 | | 2/2012 | Maekawa |

(Continued)

FOREIGN PATENT DOCUMENTS

| | | |
|---|---|---|
| JP | 2005-065452 A | 3/2005 |
| JP | 2009-183034 A | 8/2009 |
| JP | 2009-254045 A | 10/2009 |

OTHER PUBLICATIONS

Shinnaka, "A New Speed-Varying Ellipse Voltage Injection Method for Sensorless Drive of Permanent-Magnet Synchronous Motors with Pole Saliency—New PLL Method Using High-Frequency Current Component Multiplied Signal", IEEE Transactions on Industry Applications, vol. 44, No. 3, May/Jun. 2008, pp. 777-788.

(Continued)

*Primary Examiner* — Erick Glass
(74) *Attorney, Agent, or Firm* — Keating & Bennett, LLP

(57) ABSTRACT

A method of estimating a rotational position of a motor having saliency includes the steps of a) superimposing, on a drive voltage to rotate a rotating portion of the motor, a measuring voltage having a predetermined frequency higher than a frequency of the drive voltage to generate a plurality of voltages, and supplying the plurality of voltages to a stationary portion of the motor; b) in parallel with step a), extracting a component of the predetermined frequency in a current flowing in the stationary portion as an extracted current; c) calculating a sum of squares of the extracted current and a phase-shifted current obtained by shifting a phase of the extracted current by $\pi/2$ to acquire a composite signal related to an amplitude of the extracted current; and d) acquiring a rotational position of the rotating portion based on the composite signal.

6 Claims, 8 Drawing Sheets

(56) References Cited

U.S. PATENT DOCUMENTS

| | | | |
|---|---|---|---|
| 8,536,812 B2 | 9/2013 | Maekawa | |
| 8,610,388 B2 | 12/2013 | Ito et al. | |
| 2008/0018273 A1* | 1/2008 | Kanamori | H02P 6/18 318/268 |
| 2010/0033064 A1* | 2/2010 | Tanaka | G01B 7/30 310/67 R |
| 2013/0049656 A1* | 2/2013 | Yasui | H02P 21/00 318/400.02 |
| 2014/0327379 A1* | 11/2014 | Yang | H02P 6/18 318/400.02 |
| 2015/0244298 A1* | 8/2015 | Takaki | H02P 21/32 318/400.02 |

OTHER PUBLICATIONS

Corley et al., "Rotor Position and Velocity Estimation for a Salient-Pole Permanent Magnet Synchronous Machine at Standstill and High Speeds", IEEE Transactions on Industry Applications, vol. 34, No. 4, Jul./Aug. 1998, pp. 784-789.

* cited by examiner

METHOD OF ESTIMATING ROTATIONAL POSITION OF MOTOR, AND CONTROL APPARATUS OF MOTOR

BACKGROUND OF THE INVENTION

1. Field of the Invention

The present invention relates to a method of estimating a rotational position of a motor, and a control apparatus of a motor.

2. Description of the Related Art

Sensorless vector control, which eliminates use of a sensor for rotational position detection to reduce the number of wires in a motor, the size of the motor, and a production cost of the motor, has often been used. A high-frequency voltage injection method is known as a sensorless vector control technique. In the high-frequency voltage injection method, a voltage having a frequency higher than a frequency of a drive voltage for a motor is applied to the motor, and a rotational position (i.e., a phase) of the motor is estimated based on a response current.

For example, a paper by Shinnaka, S., "A new speed-varying ellipse voltage injection method for sensorless drive of permanent—magnet synchronous motors with pole saliency—New PLL method using high-frequency current component multiplied signal" (*IEEE Transactions* on Industry Applications, 44(3), 2008, pp. 777-788), is known. In a method described in this paper, a high-frequency voltage is generated in a $\gamma\delta$ rotating reference frame. This voltage is transformed to a $\alpha\beta$ stationary reference frame through Park transformation, and the resulting voltage is applied to a motor through space vector PWM and an inverter. Three-phase high-frequency currents flowing in the motor are extracted using band-pass filters, and are transformed to the $\gamma\delta$ rotating reference frame. A $\gamma$-axis current and a $\delta$-axis current are multiplied together, and the resulting signal is subjected to low-pass filtering to generate a signal of a single channel. This signal is used to estimate the rotational position of the motor through a PLL.

Further, a paper by Corley, M. J. and Lorenz, R. D., "Rotor position and velocity estimation for a salient-pole permanent magnet synchronous machine at standstill and high speeds" (*IEEE Transactions* on Industry Applications, 34(4), 1998, pp. 784-789), is known. In a method described in this paper, using response currents in a stationary reference frame and the sine and cosine of an estimated rotational position (i.e., angle), a signal representing a d-axis component of a high-frequency current is obtained. This signal is passed through a band-pass filter or the like to obtain an error signal representing a difference between the estimated rotational position and an actual rotational position. This error signal is inputted to an observer. The observer minimizes the error to track the rotational position.

In each of the above methods, a process requiring a high computational load, such as, for example, transformation between stationary and rotating reference frames, needs to be performed in an arithmetic portion. An increase in the computational load on the arithmetic portion may affect precision with which the rotational position of a rotating portion is sensed. Accordingly, there is a demand for a novel technique to precisely sense the rotational position of the rotating portion with a low computational load.

SUMMARY OF THE INVENTION

A method of estimating a rotational position of a motor having saliency according to a preferred embodiment of the present invention includes steps a), b), c), and d).

In the step a), on a drive voltage to rotate a rotating portion of the motor, a measuring voltage having a predetermined frequency higher than a frequency of the drive voltage is superimposed to generate a plurality of voltages, and the plurality of voltages are supplied to a stationary portion of the motor. In step b), a component of the predetermined frequency in a current flowing in the stationary portion is extracted as an extracted current in parallel with step a). In step c), a sum of squares of the extracted current and a phase-shifted current obtained by shifting a phase of the extracted current by $\pi/2$ is calculated to acquire a composite signal related to an amplitude of the extracted current. In step d), a rotational position of the rotating portion is acquired based on the composite signal.

A control apparatus of a motor having saliency according to a preferred embodiment of the present invention includes a voltage supply section, a current extraction section, a composite signal acquisition section, and a rotational position acquisition section.

The voltage supply section is arranged to superimpose, on a drive voltage to rotate a rotating portion of the motor, a measuring voltage having a predetermined frequency higher than a frequency of the drive voltage to generate a plurality of voltages, and supply the plurality of voltages to a stationary portion of the motor.

The current extraction section is arranged to extract a component of the predetermined frequency in a current flowing in the stationary portion as an extracted current. The composite signal acquisition section is arranged to calculate a sum of squares of the extracted current and a phase-shifted current obtained by shifting a phase of the extracted current by $\pi/2$ to acquire a composite signal related to an amplitude of the extracted current. The rotational position acquisition section is arranged to acquire a rotational position of the rotating portion based on the composite signal.

The voltage supply section is arranged to control a phase of the drive voltage based on the rotational position of the rotating portion.

According to preferred embodiments of the present invention, it is possible to precisely sense the rotational position of the rotating portion with a low computational load.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
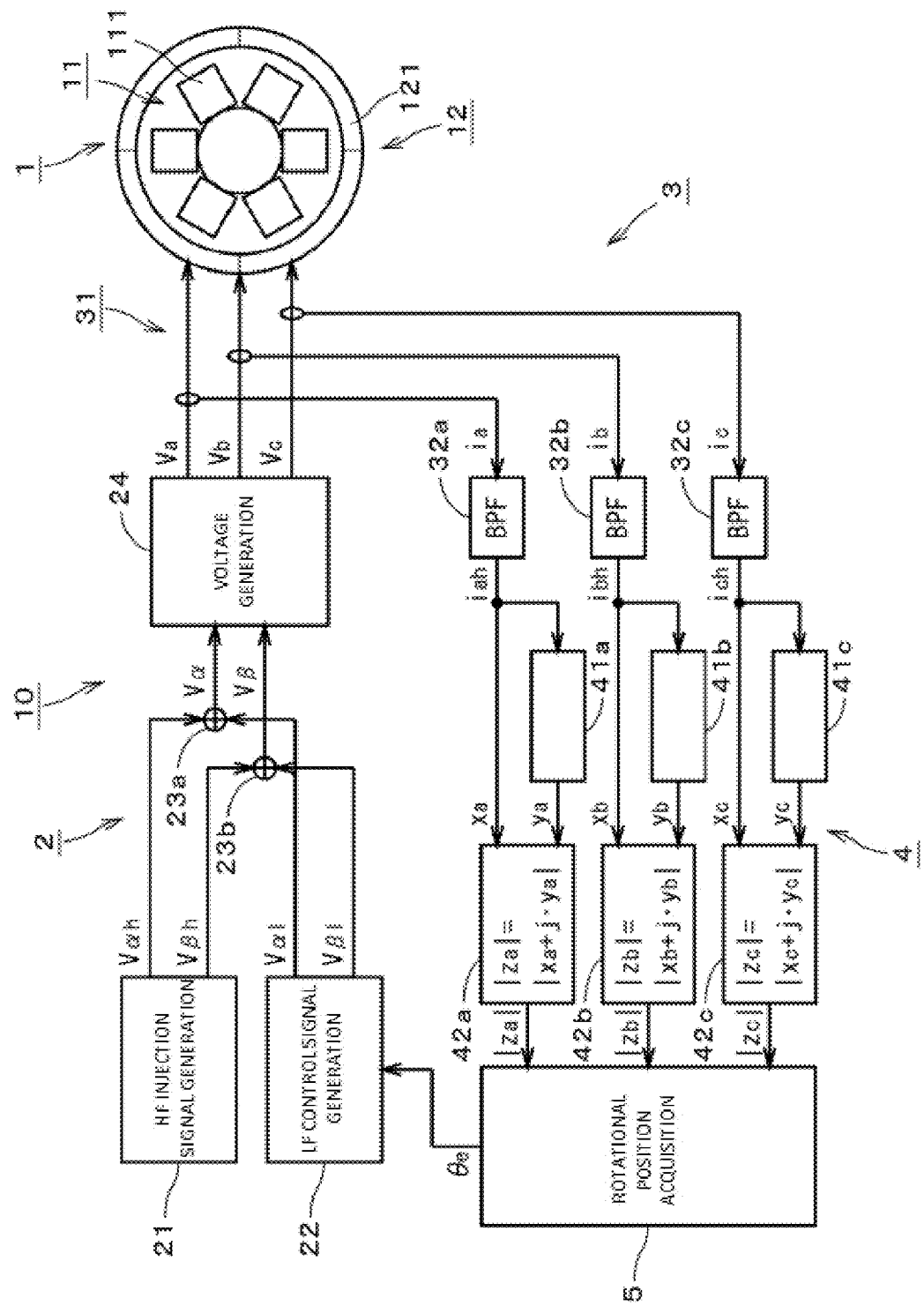
FIG. 1 is a diagram illustrating the structure of a control apparatus of a motor according to a first preferred embodiment of the present invention.

FIG. 1 is a diagram illustrating the structure of a control apparatus 10 of a motor 1 according to a first preferred embodiment of the present invention. Components of the control apparatus 10 are mounted on a circuit board of the motor 1, for example. Note that the control apparatus 10 may be provided separately from the circuit board (e.g., an inverter or the like). The motor 1 is, for example, a permanent-magnet synchronous motor, and has saliency. The motor 1 includes a stationary portion 11 and a rotating portion (i.e., a rotor) 12. The stationary portion 11 includes a stator 111. The rotating portion 12 includes a permanent magnet 121. The stationary portion 11 is arranged to rotatably support the rotating portion 12.

The control apparatus 10 includes a voltage supply section 2, a current extraction section 3, a composite signal acquisition section 4, and a rotational position acquisition section 5. A portion of the control apparatus 10 may be implemented via an arithmetic portion including software, for example. Accordingly, these components do not need to be provided as physically separate components. In other words, portions of the control apparatus 10 may be implemented in either software or hardware.

The voltage supply section 2 includes an HF injection signal generation section 21, an LF control signal generation section 22, two adders 23a and 23b, and a voltage generation section 24. The HF injection signal generation section 21 is arranged to generate a high-frequency injection signal which varies in an $\alpha$-axis direction of an $\alpha\beta$ reference frame, and a high-frequency injection signal which varies in a $\beta$-axis direction of the $\alpha\beta$ reference frame. Hereinafter, the high-frequency injection signal will be referred to as an "HF injection signal". The HF injection signal is, for example, a sinusoidal signal. In FIG. 1, the HF injection signal for an $\alpha$ axis is denoted as "V$\alpha$h", whereas the HF injection signal for a $\beta$ axis is denoted as "V$\beta$h". Note that each of the HF injection signals V$\alpha$h and V$\beta$h may alternatively be a signal having another waveform. Here, on the assumption that a reference frame in which currents flowing through three-phase stator windings are represented by vectors is an ABC reference frame, the $\alpha\beta$ reference frame is a two-phase stationary reference frame obtained by subjecting the ABC reference frame to Clarke transformation. The $\alpha$ axis and the $\beta$ axis are perpendicular to each other.

The LF control signal generation section 22 is arranged to generate low-frequency control signals for the $\alpha$ and $\beta$ axes of the $\alpha\beta$ reference frame. Hereinafter, the low-frequency control signal will be referred to as a "LF control signal". Each LF control signal is generated using various set values entered by a user, and input such as, for example, a rotational position of the rotating portion 12 acquired by the rotational position acquisition section 5. The LF control signal is a signal used to control rotation of the rotating portion 12. Generation of the LF control signal is based on an algorithm of vector control (Field Oriented Control (FOC)), direct torque control (DTC), PID control, six-step control, or the like. In FIG. 1, the LF control signal for the $\alpha$ axis is denoted as "V$\alpha$l", whereas the LF control signal for the $\beta$ axis is denoted as "V$\beta$l". The adder 23a superimposes the HF injection signal V$\alpha$h for the $\alpha$ axis on the LF control signal V$\alpha$l for the $\alpha$ axis, and outputs a resulting superimposed signal V$\alpha$ for the $\alpha$ axis. The adder 23b superimposes the HF injection signal V$\beta$h for the $\beta$ axis on the LF control signal V$\beta$l for the $\beta$ axis, and outputs a resulting superimposed signal V$\beta$ for the $\beta$ axis.

The voltage generation section 24 includes, for example, a linear power amplifier capable of two- to three-phase transformation (i.e., $\alpha\beta$ to ABC transformation), a space vector pulse width modulation (PWM) inverter, or the like. The two- to three-phase transformation transforms signals for the $\alpha$ and $\beta$ axes into signals for A, B, and C axes each of which corresponds to a separate one of three-phase voltages to be supplied to the stationary portion 11. That is, the two- to three-phase transformation transforms signals in the $\alpha\beta$ reference frame into signals in the ABC reference frame. The voltage generation section 24 supplies three-phase voltages Va, Vb, and Vc corresponding to the A, B, and C axes, respectively, to the stationary portion 11. The HF injection signal generation section 21, the LF control signal generation section 22, and the adders 23a and 23b can be regarded collectively as a voltage command generation section arranged to generate a voltage command as to the voltages to be supplied to the motor 1. The voltage generation section 24 supplies the voltages to the motor 1 based on the voltage command supplied from the voltage command generation section.

The current extraction section 3 includes a current signal acquisition unit 31 and three extractors 32a, 32b, and 32c. The current signal acquisition unit 31 is a so-called current sensor, and includes, for example, a shunt including an amplification circuit, a shunt resistor, a Hall effect current transducer, or the like. The current signal acquisition unit 31 is arranged to acquire three-phase currents ia, ib, and ic flowing in the stationary portion 11. Each of the extractors 32a to 32c includes, for example, a band-pass filter (BPF). The extractors 32a, 32b, and 32c are arranged to extract high-frequency (HF) components of the three-phase currents ia, ib, and ic as extracted currents iah, ibh, and ich for the A, B, and C axes, respectively.

The composite signal acquisition section 4 includes three Hilbert transformers 41a, 41b, and 41c, and three signal computation units 42a, 42b, and 42c. Each of the Hilbert transformers 41a to 41c is implemented using a finite impulse response (FIR) filter, fast Fourier transform (FFT), or the like. In the present preferred embodiment, each of the Hilbert transformers 41a to 41c is implemented using the FIR filter. The signal computation units 42a, 42b, and 42c are arranged to generate composite signals for the A, B, and C axes, respectively. The composite signals are position sensing signals used to acquire the rotational position of the rotating portion 12, which will be described below. The composite signals will be described in detail below. In FIG. 1, the composite signal for the A axis is denoted as |za|, the composite signal for the B axis is denoted as |zb|, and the composite signal for the C axis is denoted as |zc|. The extractors 32a to 32c, the Hilbert transformers 41a to 41c, and the signal computation units 42a to 42c can be regarded collectively as a signal processing unit arranged to process the three-phase currents ia, ib, and is to generate the composite signals for the A, B, and C axes.

The rotational position acquisition section 5 is arranged to acquire the rotational position $\theta$e of the rotating portion 12 based on the composite signals. The rotational position $\theta$e is used by the LF control signal generation section to generate the LF control signals V$\alpha$l and V$\beta$l. That is, control of rotation of the motor 1 is performed based on the rotational position $\theta$e.

Figure 2:
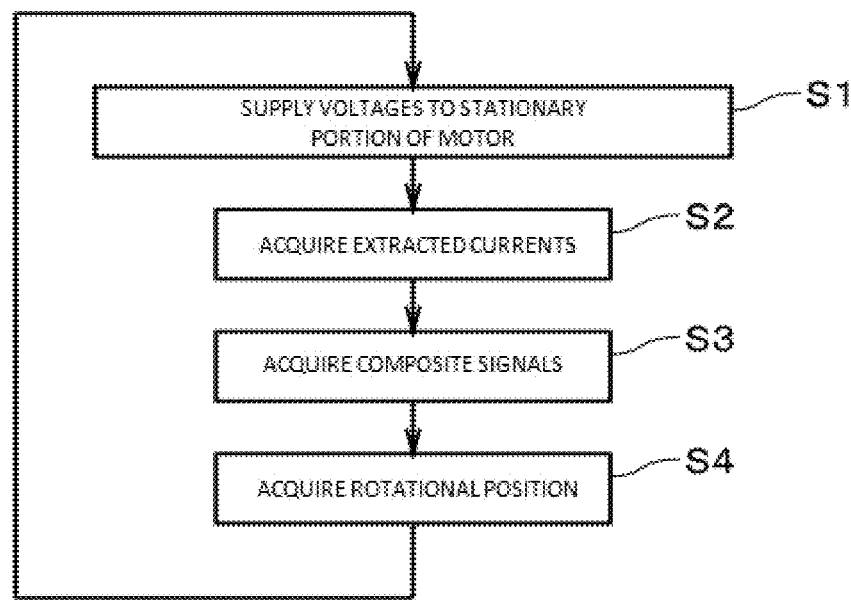
FIG. 2 is a flowchart illustrating a procedure performed by the control apparatus.

Next, processes performed by the control apparatus 10 while the motor 1 is in operation will now be described below with reference to FIG. 2. In the control apparatus 10, the processes illustrated in FIG. 2 are continuously repeated while the motor 1 is in operation. Processes related to various signals described below are, to be precise, processes related to values of those signals at a given time.

In the LF control signal generation section 22, the LF control signal Vαl for the α axis and the LF control signal Vβl for the β axis are generated to rotate the rotating portion 12 of the motor 1. In the HF injection signal generation section 21, the HF injection signal Vαh for the α axis and the HF injection signal Vβh for the β axis are generated. Assuming that an angular frequency is denoted as ω, and time is denoted as t, the HF injection signal Vαh for the α axis and the HF injection signal Vβh for the β axis are expressed by Eq. 1 below.

$$\begin{cases} V_{\alpha h} = \cos(\omega t) \\ V_{\beta h} = \sin(\omega t) \end{cases} \qquad \text{Eq. 1}$$

Figure 3:
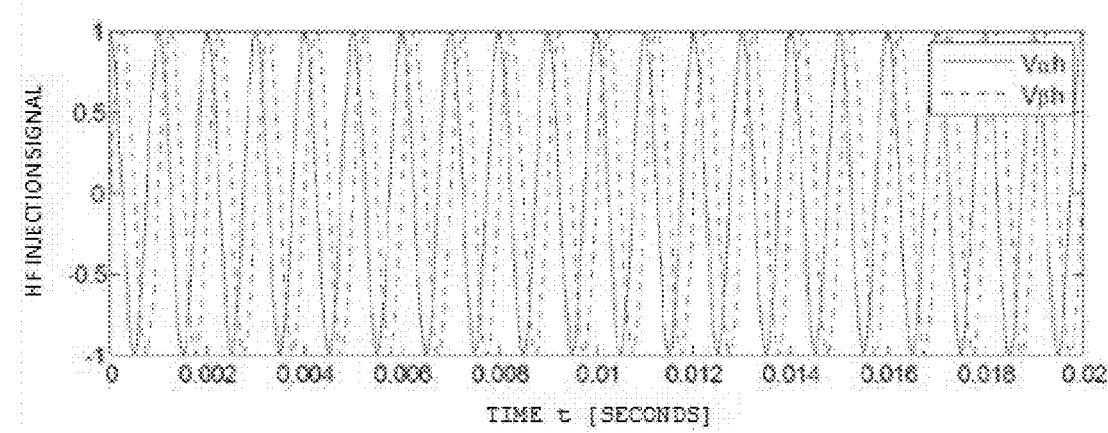
FIG. 3 is a graph illustrating HF injection signals.

FIG. 3 is a graph showing examples of the HF injection signals Vαh and Vβh. Each of the HF injection signals Vαh and Vβh has a frequency higher than a frequency of each of the LF control signals Vαl and Vβl. A look-up table may be created by previously measuring response values of the rotational position θe obtained in response to the HF injection signals Vαh and Vβh, so that a response value of the rotational position θe in response to the HF injection signals Vαh and Vβh at a given time can be acquired. The HF injection signal Vαh for the α axis is superimposed on the LF control signal Vαl for the α axis to generate the superimposed signal Vα for the α axis. The HF injection signal Vβh for the β axis is superimposed on the LF control signal Vβl for the β axis to generate the superimposed signal Vβ for the β axis. In the voltage generation section 24, the three-phase voltages Va, Vb, and Vc are generated based on the superimposed signal Vα for the α axis and the superimposed signal Vβ for the β axis.

Each of the voltages Va, Vb, and Vc includes a drive voltage ascribed to the LF control signals Vαl and Vβl, and a measuring voltage ascribed to the HF injection signals van and Vβh. That is, each of the plurality of voltages Va, Vb, and Vc generated in the voltage supply section 2 is essentially a voltage in which the measuring voltage, which has a predetermined frequency higher than a frequency of the drive voltage, is superimposed on the drive voltage, which is used to rotate the rotating portion 12. The frequency of the measuring voltage is, for example, 20 kHz or less. The frequency of the measuring voltage is preferably in the range of about 500 Hz to about 1 kHz. The voltages Va, Vb, and Vc are supplied to the stationary portion 11 of the motor 1 (step S1). The supply of the voltages Va, Vb, and Vc to the stationary portion 11 is actually performed continuously, and steps S2, S3, and S4 described below are performed in parallel with step S1.

In the current signal acquisition unit 31, the three-phase currents ia, ib, and ic flowing in the stationary portion 11 are acquired. In the extractors 32a, 32b, and 32c, frequency components of the HF injection signals Vαh and Vβh in the three-phase currents ia, ib, and ic are extracted as the extracted currents iah, ibh, and ich for the A, B, and C axes, respectively (step S2). Thus, in the current extraction section 3, frequency components of the measuring voltages in the plurality of currents ia, ib, and ic flowing in the stationary portion 11 are extracted as the plurality of extracted currents iah, ibh, and ich.

Figure 4:
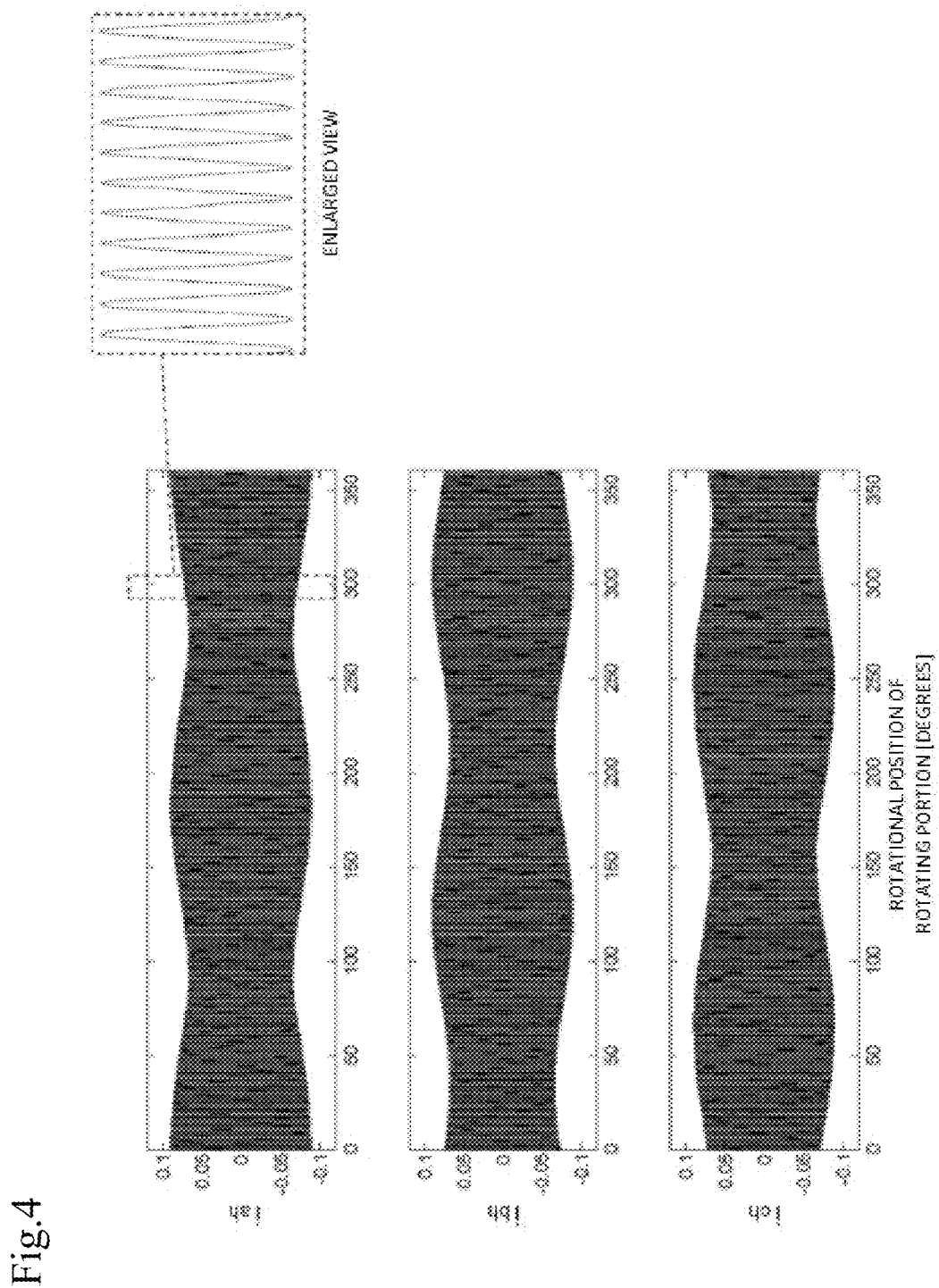
FIG. 4 shows graphs illustrating extracted currents.

FIG. 4 shows graphs showing the plurality of extracted currents iah, ibh, and ich. In FIG. 4, a vertical axis represents the value of each of the extracted currents iah, ibh, and ich, whereas a horizontal axis represents the rotational position of the rotating portion 12. As shown in FIG. 4, the amplitude of each of the extracted currents iah, ibh, and ich varies depending on the rotational position of the rotating portion 12. That is, an amplitude profile, which represents a change in the amplitude of each of the extracted currents iah, ibh, and ich, is a function of the rotational position of the rotating portion 12. Assuming that the amplitude profiles of the extracted currents iah, ibh, and ich are denoted as Aa, Ab, and Ac, respectively, the extracted currents iah, ibh, and ich are expressed by Eq. 2 below. Note that, in Eq. 2, the amplitude profiles, which are functions of the rotational position θe of the rotating portion 12, are denoted as Aa(θe), Ab(θe), and Ac(θe), and the extracted currents, which are functions of time, are denoted as iah(t), ibh(t), and ich(t). This also applies to Eqs. 3 and 4 presented below.

$$\begin{cases} i_{ah}(t) \\ i_{bh}(t) \\ i_{ch}(t) \end{cases} = \begin{cases} A_a(\theta_e) \cdot \cos(\omega t) \\ A_b(\theta_e) \cdot \cos\left(\omega t - \frac{2\pi}{3}\right) \\ A_c(\theta_e) \cdot \cos\left(\omega t - \frac{4\pi}{3}\right) \end{cases} \qquad \text{Eq. 2}$$

Moreover, the extracted currents iah, ibh, and ich can be transformed into complex analytic signals za, zb, and zc, respectively, using Eq. 3 below.

$$\begin{cases} z_a(t) \\ z_b(t) \\ z_c(t) \end{cases} = \begin{cases} x_a(t) \\ x_b(t) \\ x_c(t) \end{cases} + j \cdot \begin{cases} y_a(t) \\ y_b(t) \\ y_c(t) \end{cases} \qquad \text{Eq. 3}$$

where $$\begin{cases} x_a(t) \\ x_b(t) \\ x_c(t) \end{cases} = \begin{cases} i_{ah}(t) \\ i_{bh}(t) \\ i_{ch}(t) \end{cases} = \begin{cases} A_a(\theta_e) \cdot \cos(\omega t) \\ A_b(\theta_e) \cdot \cos\left(\omega t - \frac{2\pi}{3}\right) \\ A_c(\theta_e) \cdot \cos\left(\omega t - \frac{4\pi}{3}\right) \end{cases}$$

$$\begin{cases} y_a(t) \\ y_b(t) \\ y_c(t) \end{cases} = \begin{cases} HT[i_{ah}(t)] \\ HT[i_{bh}(t)] \\ HT[i_{ch}(t)] \end{cases} = \begin{cases} A_a(\theta_e) \cdot \sin(\omega t) \\ A_b(\theta_e) \cdot \sin\left(\omega t - \frac{2\pi}{3}\right) \\ A_c(\theta_e) \cdot \sin\left(\omega t - \frac{4\pi}{3}\right) \end{cases}$$

HT[•] represents Hilbert transform expressed by the following formula:

$$HT[i(t)] = \frac{1}{\pi} \int_{-\infty}^{\infty} \frac{i(\tau)}{t - \tau} d\tau.$$

Figure 5:
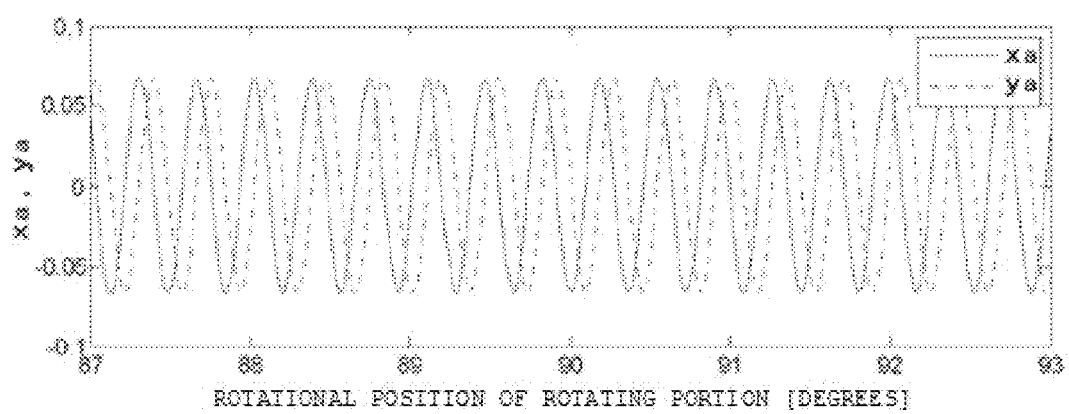
FIG. 5 is a graph illustrating a real part and an imaginary part of a complex analytic signal.

Imaginary parts ya, yb, and yc in Eq. 3 are obtained from the extracted currents iah, ibh, and ich, respectively, using the Hilbert transform. The Hilbert transform shifts the phase of negative frequency components by π/2 radians, and shifts the phase of positive frequency components by −π/2 radians. Accordingly, cosine functions are changed to sine functions through the Hilbert transform. In the composite signal acquisition section 4, the Hilbert transform of the extracted currents iah, ibh, and ich is performed by the Hilbert transformers 41a, 41b, and 41c, respectively, to obtain the imaginary parts ya, yb, and yc. Here, each of the Hilbert transformers 41a to 41c is an FIR filter. The imaginary parts ya, yb, and yc are phase-shifted currents obtained by shifting the phase of the extracted currents iah, ibh, and ich, respectively, by π/2. Real parts xa, xb, and xc in Eq. 3 are the extracted currents iah, ibh, and ich themselves, respectively. FIG. 5 is a graph showing variations of the real part xa and the imaginary part ya with the rotational position of the rotating portion 12.

The real parts xa, xb, and xc and the imaginary parts ya, yb, and yc are inputted to the signal computation units 42a to 42c. In practice, the phase of each of the real parts xa, xb, and xc, which correspond to the extracted currents iah, ibh, and ich, respectively, is delayed to compensate for a delay caused by the Hilbert transform. In the signal computation units 42a to 42c, the composite signals |za|, |zb|, and |zc|, which represent absolute values of the complex analytic signals za, zb, and zc, respectively, are computed using Eq. 4 below (step S3).

$$\left\{\begin{array}{l}|z_a(t)|\\|z_b(t)|\\|z_c(t)|\end{array}\right\} = \left\{\begin{array}{l}\sqrt{x_a^2(t)+y_a^2(t)}\\\sqrt{x_b^2(t)+y_b^2(t)}\\\sqrt{x_c^2(t)+y_c^2(t)}\end{array}\right\}$$

$$= \left\{\begin{array}{l}\sqrt{A_a^2(\theta_e)\cdot\cos^2(\omega t)+A_a^2(\theta_e)\cdot\sin^2(\omega t)}\\\sqrt{A_b^2(\theta_e)\cdot\cos^2\left(\omega t-\frac{2\pi}{3}\right)+A_b^2(\theta_e)\cdot\sin^2\left(\omega t-\frac{2\pi}{3}\right)}\\\sqrt{A_c^2(\theta_e)\cdot\cos^2\left(\omega t-\frac{4\pi}{3}\right)+A_c^2(\theta_e)\cdot\sin^2\left(\omega t-\frac{4\pi}{3}\right)}\end{array}\right\}$$

$$= \left\{\begin{array}{l}A_a(\theta_e)\cdot\sqrt{\cos^2(\omega t)+\sin^2(\omega t)}\\A_b(\theta_e)\cdot\sqrt{\cos^2\left(\omega t-\frac{2\pi}{3}\right)+\sin^2\left(\omega t-\frac{2\pi}{3}\right)}\\A_c(\theta_e)\cdot\sqrt{\cos^2\left(\omega t-\frac{4\pi}{3}\right)+\sin^2\left(\omega t-\frac{4\pi}{3}\right)}\end{array}\right\}$$

$$= \left\{\begin{array}{l}A_a(\theta_e)\\A_b(\theta_e)\\A_c(\theta_e)\end{array}\right\}$$

Eq. 4

Figure 6:
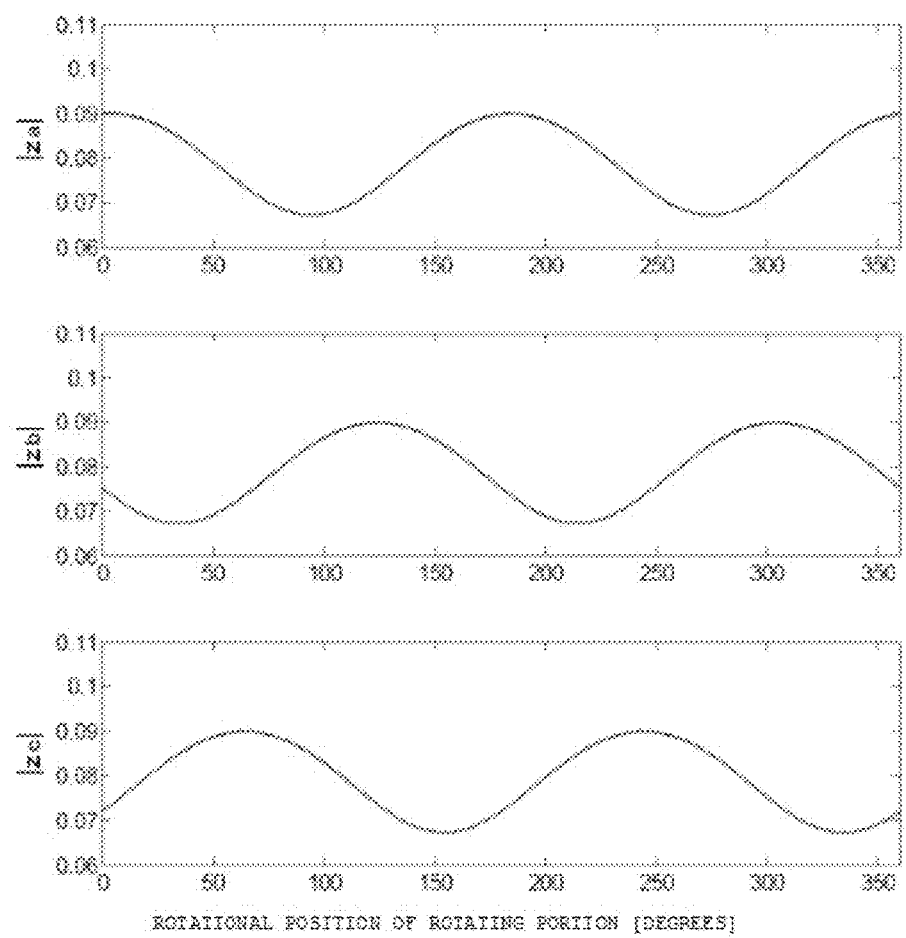
FIG. 6 shows graphs illustrating composite signals.

That is, the sum of squares of each of the extracted currents iah, ibh, and ich and a corresponding one of the phase-shifted currents obtained by shifting the phase of the extracted currents iah, ibh, and ich by π/2 is calculated, and further, the square roots of the sums of the squares are acquired as the composite signals |za|, |zb|, and |zc|. FIG. 6 shows graphs showing variations of the composite signals |za|, |zb|, and |zc| with the rotational position of the rotating portion 12.

Here, it is apparent from the derivation of the equation in Eq. 4 that the composite signals |za|, |zb|, and |zc| correspond to the amplitude profiles Aa, Ab, and Ac of the extracted currents iah, ibh, and ich, respectively. That is, the composite signals |za|, |zb|, and |zc| are signals that represent variations of the amplitudes of the extracted currents iah, ibh, and ich, respectively. Therefore, it can be said that the composite signals |za|, |zb|, and |zc| are usable to calculate the rotational position θe of the motor 1 having saliency. The composite signals |za|, |zb|, and |zc| are inputted to the rotational position acquisition section 5.

Figure 7:
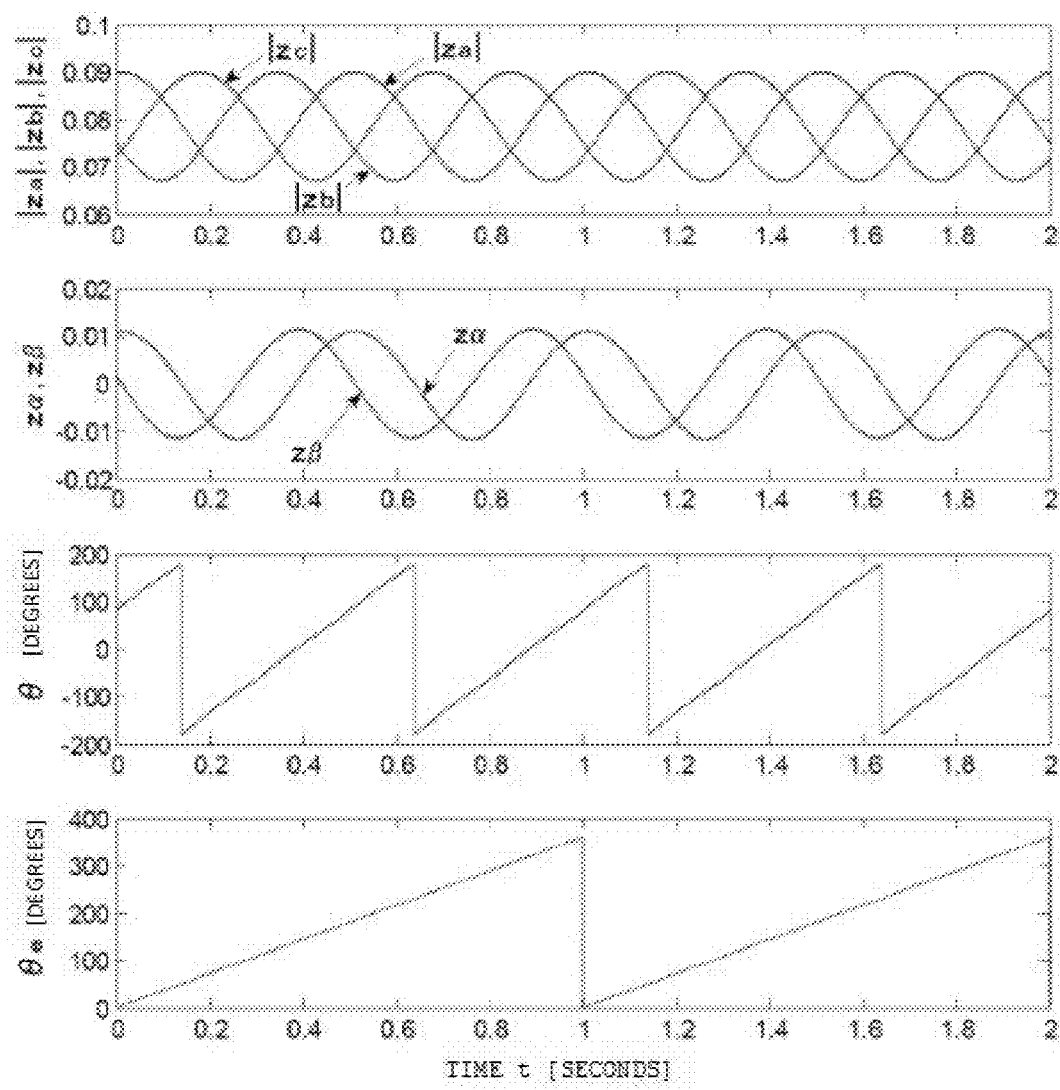
FIG. 7 shows graphs illustrating signals obtained in a rotational position acquisition section according to the first preferred embodiment of the present invention.

FIG. 7 shows graphs showing signals obtained in the rotational position acquisition section 5. The graph at the top in FIG. 7 illustrates the composite signals |za|, |zb|, and |zc|. The second graph from the top in FIG. 7 illustrates a composite signal zα for the α axis and a composite signal zβ for the β axis, which will be described below, and the third graph from the top in FIG. 7 illustrates an angle θ, which will be described below. The graph at the bottom in FIG. 7 illustrates the rotational position θe.

In the rotational position acquisition section 5, the composite signals |za|, |zb|, and |zc| for the A, B, and C axes are subjected to the Clarke transformation, which is a three- to two-phase transformation (i.e., ABC to αβ transformation). As a result, the composite signal zα for the α axis and the composite signal zβ for the β axis as illustrated in the second graph from the top in FIG. 7 are obtained. Next, using the composite signal zα for the α axis and the composite signal zβ for the β axis, an arctangent function, atan 2(zα, zβ), is obtained as the angle θ (see the third graph from the top in FIG. 7). In other words, the angle θ, which is an angle between the β axis and a vector from the origin to a point having an α value of zα and a β value of zβ in the αβ reference frame, is obtained. Then, the angle θ is offset by a specified angle to be adjusted to 0 degrees of the rotational position θe of the rotating portion 12.

Here, referring to FIG. 4, the amplitude profile of each extracted current undergoes two cycles of variation during one rotation of the rotating portion 12, i.e., from 0 degrees to 360 degrees of the rotational position. Accordingly, a value of the above angle θ offset by an angle within the range of 0 degrees to 720 degrees divided by two is acquired as the rotational position θe of the rotating portion 12 as illustrated in the graph at the bottom in FIG. 7 (step S4). In the rotational position acquisition section 5, the rotational position θe of the motor 1 is estimated based on the composite signals |za|, |zb|, and |zc| in the above-described manner.

While the motor 1 is in operation, the above-described steps S1 to S4 are performed repeatedly. As mentioned above, in each of steps S1 to S4, to be precise, values of the signals at a given time are dealt with. Here, in the generation of the three-phase voltages Va, Vb, and Vc in step S1, values of the LF control signals Vα1 and Vβ1 are generated based on a value of the rotational position θe of the rotating portion 12 acquired in a previous iteration of step S4, and the set values, such as, for example, a rotational speed. That is, phases of the drive voltages for the motor 1 are controlled based on the rotational position θe of the rotating portion 12. Thus, the rotation of the motor 1 can be controlled with high precision.

As described above, in the control apparatus 10 of the motor 1, on each drive voltage used to rotate the rotating portion 12, the measuring voltage having a frequency higher than the frequency of the drive voltage is superimposed, and the plurality of voltages generated are supplied to the stationary portion 11. The frequency components of the measuring voltages in the currents flowing in the stationary portion 11 are extracted as the extracted currents. The sum of squares of each of the extracted currents and the phase-shifted current obtained by shifting the phase of the extracted current by π/2 is calculated to acquire the composite signals related to the amplitudes of the extracted currents. The rotational position of the rotating portion 12 is acquired based on these composite signals. The rotational position of the rotating portion 12 can thus be acquired with high precision. Moreover, the phases of the drive voltages for the motor 1 are controlled based on the rotational position of the rotating portion 12. This allows the motor 1 to rotate with high precision.

In the control apparatus 10, each of addition of the measuring voltages and signal processing related to the extracted currents is performed in the stationary reference frame. This eliminates a need to perform complicated transformation or the like between stationary and rotating reference frames as required in the aforementioned method proposed by Shinnaka, S. and the aforementioned method proposed by Corley, M. J. et al., allowing acquisition of the rotational position with a low computational load.

In addition, the method proposed by Shinnaka, S. and the method proposed by Corley, M. J. et al have problems in that, in a low-speed operation, induced voltages are not generated, making a rotation direction unclear, and a high degree of precision cannot be achieved. Accordingly, an observer or a PLL is required to achieve highly precise detection of the rotational position, which leads to an increase in a computational load. In view of this, the control apparatus 10 is able to achieve a reduction in the computational load in the low-speed operation.

Incidentally, it is conceivable to use filtered signals obtained by subjecting signals representing the squares of the extracted currents to low-pass filtering to estimate the rotational position. This method, however, involves generation of higher harmonics in the filtered signals, imposing a certain limitation on the degree of precision with which the rotational position is estimated based on the filtered signals. It is also conceivable to use filtered signals obtained by subjecting signals representing the absolute values of the extracted currents to low-pass filtering to estimate the rotational position. This method, however, involves generation of noise caused by higher harmonics in the filtered signals, imposing a certain limitation on the degree of precision with which the rotational position is estimated.

In contrast to these methods, the method employed by the control apparatus 10, which acquires the square roots of the sums of the squares of the extracted currents and the phase-shifted currents as the composite signals, does not involve generation of higher harmonics in the composite signals. This allows the rotational position of the rotating portion 12 to be detected with higher precision.

Further, the low-pass filtering is typically performed using an infinite impulse response (IIR) filter. The IIR filter is unstable, and does not have a linear phase property. This makes an operation related to the acquisition of the rotational position unstable and complicated. In contrast, in the control apparatus 10, composite signals that are norms of analytic signals are acquired, and the low-pass filtering is not performed. In addition, in the present preferred embodiment, the Hilbert transform performed when the composite signals are acquired is performed using the FIR filters. The FIR filter is essentially more stable than the IIR filter, and has the linear phase property. This leads to easy and stable implementation of the processes related to the acquisition of the rotational position. Note that, although a low-pass filter can be implemented by an FIR filter, this will involve a much longer processing time and a greater computational load than when the Hilbert transform is used.

Figure 8:
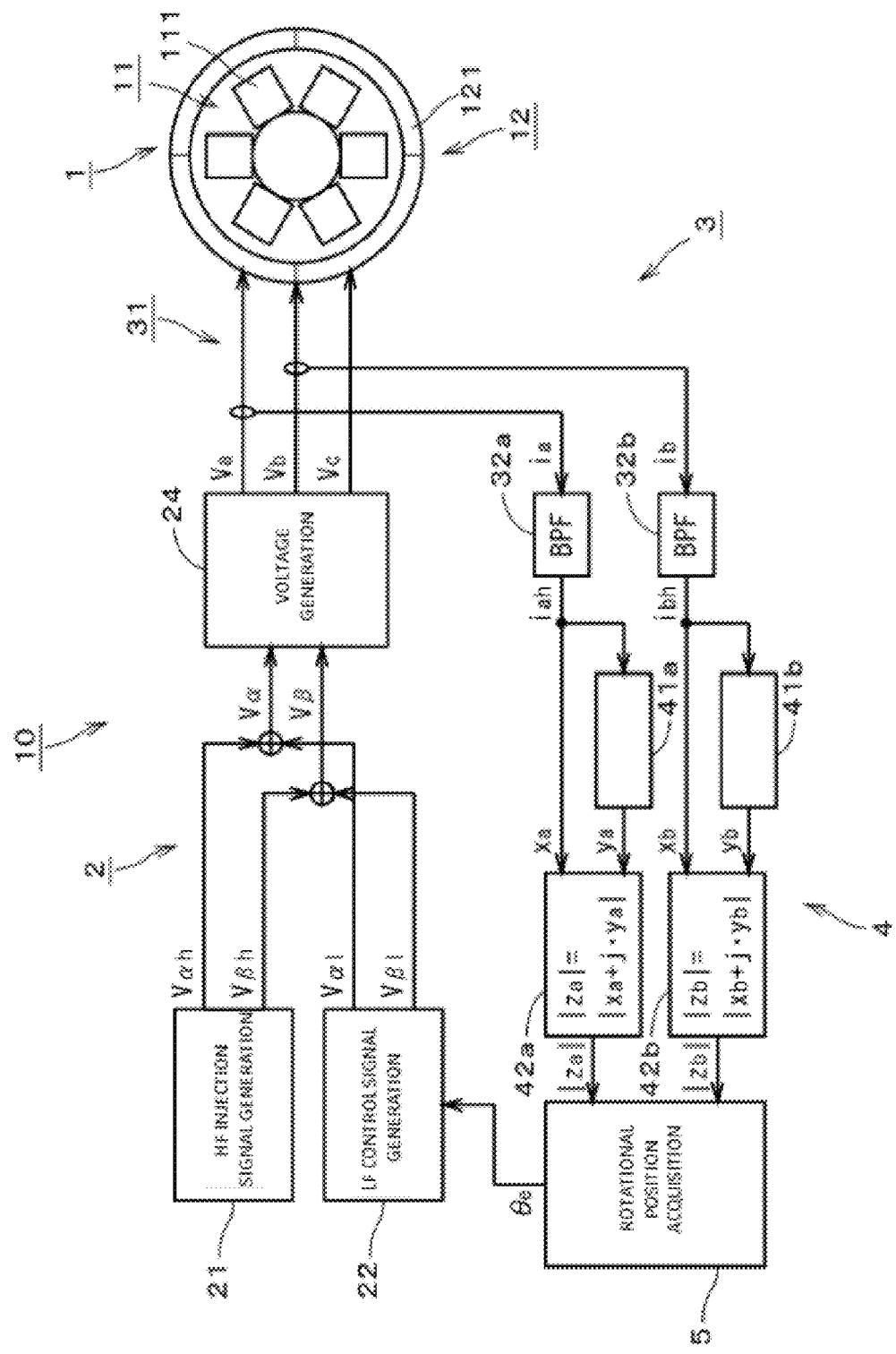
FIG. 8 is a diagram illustrating the structure of a control apparatus of a motor according to a second preferred embodiment of the present invention.

In the above-described first preferred embodiment, on the assumption that the extracted currents for the A, B, and C axes are a first, a second, and a third extracted current, respectively, the composite signal is acquired for each of the first, second, and third extracted currents. However, the rotational position can be acquired even when only two of the extracted currents are extracted. FIG. 8 is a diagram illustrating the structure of a control apparatus 10 of a motor according to a second preferred embodiment of the present invention. The control apparatus 10 illustrated in FIG. 8 is different from the control apparatus 10 according to the first preferred embodiment in components related to the acquisition of the composite signal |zc| for the C axis. More specifically, the control apparatus 10 illustrated in FIG. 8 is different from the control apparatus 10 illustrated in FIG. 1 in that the extractor 32c, the Hilbert transformer 41c, and the signal computation unit 42c are omitted. The control apparatus 10 illustrated in FIG. 8 is otherwise similar in structure to the control apparatus 10 illustrated in FIG. 1, and accordingly, like members or portions are designated by like reference numerals.

In the control apparatus 10 illustrated in FIG. 8, voltages Va, Vb, and Vc are supplied to a stationary portion 11 of the motor 1 as in the first preferred embodiment (step S1 in FIG. 2). In a current signal acquisition unit 31, two currents ia and ib of three-phase currents ia, ib, and is flowing in the stationary portion 11 are acquired. In extractors 32a and 32b, extracted currents iah and ibh for the A and B axes, respectively, are extracted (step S2). In a composite signal acquisition section 4, processes for the extracted currents iah and ibh are performed in manners similar to those according to the first preferred embodiment. As a result, composite signals |za| and |zb| of two channels are acquired, and the composite signals |za| and |zb| are inputted to a rotational position acquisition section 5 (step S3).

In the rotational position acquisition section 5, a composite signal |zc| of an omitted channel is obtained using Eq. 5 below. In Eq. 5, C is a constant equal to three times a direct-current component of the composite signal |za| or the composite signal |zb|.

$$|Z_c| = C - |Z_a| - |Z_b| \qquad \text{Eq. 5}$$

Then, using the composite signals |za|, |zb|, and |zc| for the A, B, and C axes, respectively, a rotational position θe of a rotating portion 12 is estimated by the same method as that of the first preferred embodiment (step S4).

The control apparatus 10 illustrated in FIG. 8 is able to acquire the rotational position of the rotating portion 12 with a relatively high degree of precision as described above, with omission of the extractor 32c, the Hilbert transformer 41c, and the signal computation unit 42c provided in the control apparatus 10 illustrated in FIG. 1. This leads to a reduction in a production cost of the control apparatus 10.

Figure 9:
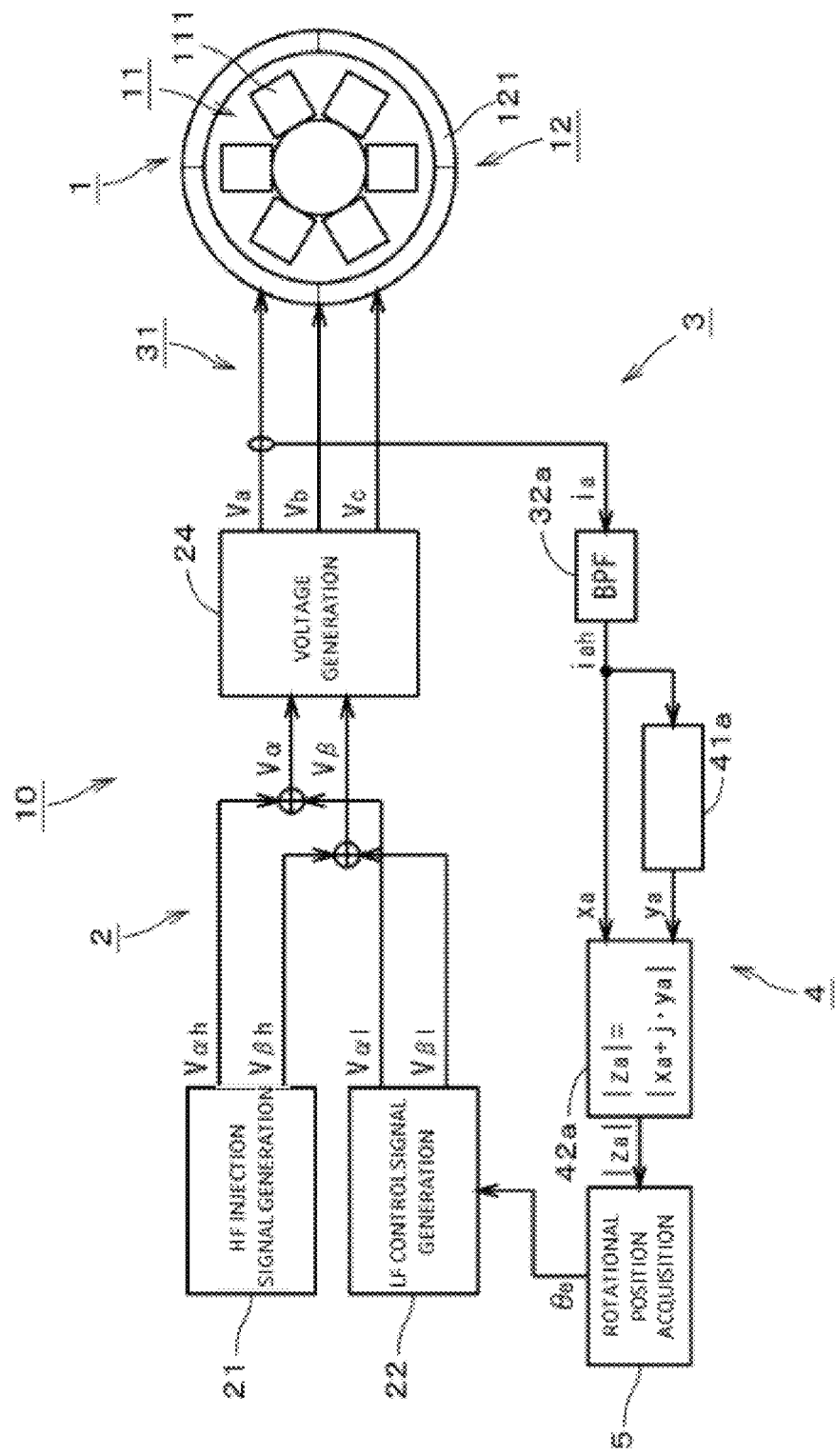
FIG. 9 is a diagram illustrating the structure of a control apparatus of a motor according to a third preferred embodiment of the present invention.

FIG. 9 is a diagram illustrating the structure of a control apparatus 10 of a motor 1 according to a third preferred embodiment of the present invention. The control apparatus 10 illustrated in FIG. 9 is different from the control apparatus 10 illustrated in FIG. 1 in components related to the acquisition of the composite signals |zb| and |zc| for the B and C axes, respectively, that is, in that the extractors 32b and 32c, the Hilbert transformers 41b and 41c, and the signal computation units 42b and 42c are omitted. The control apparatus 10 illustrated in FIG. 9 is otherwise similar in structure to the control apparatus 10 illustrated in FIG. 1, and accordingly, like members or portions are designated by like reference numerals.

In the control apparatus 10 illustrated in FIG. 9, voltages Va, Vb, and Vc are supplied to a stationary portion 11 of the motor 1 as in the first preferred embodiment (step S1 in FIG. 2). In a current signal acquisition unit 31, only a current ia of three-phase currents ia, ib, and is flowing in the stationary portion 11 is acquired. In an extractor 32a, an extracted current iah for the A axis is extracted (step S2). In a composite signal acquisition section 4, processes for the extracted current iah are performed in manners similar to those according to the first preferred embodiment. As a result, a composite signal |za| of one channel is acquired, and the composite signal |za| is inputted to a rotational position acquisition section 5 (step S3). In the rotational position acquisition section 5, the composite signal |za| is tracked using an observer, a PLL, or the like, for example, to estimate a rotational position θe of a rotating portion 12 (step S4).

The control apparatus 10 illustrated in FIG. 9 is able to acquire the rotational position of the rotating portion 12 as described above, with omission of the extractors 32b and 32c, the Hilbert transformers 41b and 41c, and the signal computation units 42b and 42c provided in the control apparatus 10 illustrated in FIG. 1.

Note that each of the control apparatuses 10 described above can be modified in various manners.

For example, HF injection signals for the A, B, and C axes may alternatively be generated and superimposed on LF control signals for the A, B, and C axes, respectively. Also, the extracted currents for the A, B, and C axes may alternatively be transformed into extracted currents for the α and β axes, and composite signals for the α and β axes may be obtained from the extracted currents for the α and β axes.

In the control apparatus 10 described above, the phase-shifted current obtained by shifting the phase of the extracted current by π/2 is easily obtained by subjecting the extracted current to the Hilbert transform. Note, however, that, the phase-shifted current may alternatively be obtained by another method depending on an apparatus design.

Note that, in each of the signal computation units 42a to 42c, the sum of the squares of the extracted current and the phase-shifted current may alternatively be treated as the composite signal. In this case, in the rotational position acquisition section 5, the rotational position of the rotating portion 12 is acquired based on composite signals representing the squares of the amplitudes of the extracted currents. As described above, each composite signal does not need to be a signal representing the amplitude of the extracted current itself, but may alternatively be any signal essentially representing the amplitude of the extracted current, i.e., any signal related to the amplitude of the extracted current.

Note that, although the control apparatus 10 described above is arranged to perform sensorless position detection and control of the motor 1, the capability of the control apparatus may alternatively be used to perform sensorless speed detection and control, or to perform sensorless initial position detection when, for example, the motor is to be activated with a large torque.

Note that the motor 1 may not be a permanent-magnet synchronous motor, but may alternatively be any other desirable motor having saliency, such as, for example, a synchronous reluctance motor.

Also note that features of the above-described preferred embodiments and the modifications thereof may be combined appropriately as long as no conflict arises.

Preferred embodiments of the present invention are applicable to control and estimation of the rotational position of various motors having saliency.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method of estimating a rotational position of a motor having saliency, the method comprising the steps of:
   a) superimposing, on a drive voltage to rotate a rotating portion of the motor, a measuring voltage having a predetermined frequency higher than a frequency of the drive voltage to generate a plurality of voltages, and supplying the plurality of voltages to a stationary portion of the motor;
   b) in parallel with step a), extracting a component of the predetermined frequency in a current flowing in the stationary portion as an extracted current;
   c) calculating a sum of squares of the extracted current and a phase-shifted current obtained by shifting a phase of the extracted current by π/2 to acquire a composite signal related to an amplitude of the extracted current; and
   d) acquiring a rotational position of the rotating portion based on the composite signal.

2. The method according to claim 1, wherein in step c), the phase-shifted current is obtained by subjecting the extracted current to Hilbert transform.

3. The method according to claim 2, wherein the Hilbert transform is performed using an FIR filter.

4. The method according to claim 1, wherein
   as the extracted current, each of a first, a second, and a third extracted current is obtained from three-phase currents flowing in the stationary portion; and
   in step c), the composite signal is acquired for each of the first, second, and third extracted currents.

5. The method according to claim 1, wherein the composite signal represents a square root of the sum of the squares.

6. A control apparatus of a motor having saliency, the control apparatus comprising:
   a voltage supply section arranged to superimpose, on a drive voltage to rotate a rotating portion of the motor, a measuring voltage having a predetermined frequency higher than a frequency of the drive voltage to generate a plurality of voltages, and supply the plurality of voltages to a stationary portion of the motor;
   a current extraction section arranged to extract a component of the predetermined frequency in a current flowing in the stationary portion as an extracted current;
   a composite signal acquisition section arranged to calculate a sum of squares of the extracted current and a phase-shifted current obtained by shifting a phase of the extracted current by π/2 to acquire a composite signal related to an amplitude of the extracted current; and
   a rotational position acquisition section arranged to acquire a rotational position of the rotating portion based on the composite signal; wherein
   the voltage supply section is arranged to control a phase of the drive voltage based on the rotational position of the rotating portion.

* * * * *